US009280835B2

(12) United States Patent
Lainema et al.

(10) Patent No.: US 9,280,835 B2
(45) Date of Patent: Mar. 8, 2016

(54) METHOD FOR CODING AND AN APPARATUS BASED ON A DC PREDICTION VALUE

(71) Applicant: Nokia Technologies Oy, Espoo (FI)

(72) Inventors: Jani Lainema, Tampere (FI); Kemal Ugur, Tampere (FI)

(73) Assignee: Nokia Technologies Oy, Espoo (FI)

( * ) Notice: Subject to any disclaimer, the term of this patent is extended or adjusted under 35 U.S.C. 154(b) by 169 days.

(21) Appl. No.: 13/654,002

(22) Filed: Oct. 17, 2012

(65) Prior Publication Data

US 2013/0094776 A1 Apr. 18, 2013

Related U.S. Application Data

(60) Provisional application No. 61/548,592, filed on Oct. 18, 2011.

(51) Int. Cl.

| | |
|---|---|
| G06K 9/36 | (2006.01) |
| G06T 9/00 | (2006.01) |
| H04N 19/105 | (2014.01) |
| H04N 19/176 | (2014.01) |
| H04N 19/61 | (2014.01) |
| H04N 19/593 | (2014.01) |
| H04N 19/14 | (2014.01) |
| H04N 19/182 | (2014.01) |
| H04N 19/19 | (2014.01) |

(52) U.S. Cl.
CPC .............. *G06T 9/004* (2013.01); *H04N 19/105* (2014.11); *H04N 19/14* (2014.11); *H04N 19/176* (2014.11); *H04N 19/182* (2014.11); *H04N 19/19* (2014.11); *H04N 19/593* (2014.11); *H04N 19/61* (2014.11)

(58) Field of Classification Search
None
See application file for complete search history.

(56) References Cited

U.S. PATENT DOCUMENTS

| | | | | |
|---|---|---|---|---|
| 7,274,825 | B1* | 9/2007 | Lee et al. | 382/239 |
| 7,492,950 | B2* | 2/2009 | Suzuki et al. | 382/232 |
| 2003/0231795 | A1 | 12/2003 | Karczewicz | |
| 2006/0153297 | A1* | 7/2006 | Boyce | 375/240.16 |
| 2008/0260027 | A1 | 10/2008 | Karczewicz | |
| 2011/0243230 | A1 | 10/2011 | Liu | |

FOREIGN PATENT DOCUMENTS

| | | |
|---|---|---|
| EP | 2081386 A1 | 7/2009 |
| EP | 2216998 A1 | 8/2010 |

OTHER PUBLICATIONS

International Search Report and Written Opinion received for corresponding Patent Cooperation Treaty Application No. PCT/FI2012/051001, dated Jan. 8, 2013, 14 pages.

\* cited by examiner

*Primary Examiner* — Eueng-Nan Yeh
(74) *Attorney, Agent, or Firm* — Alston & Bird LLP

(57) ABSTRACT

The disclosure relates to encoding and decoding image information. The encoding comprises receiving a block of pixels; determining a set of potential reference samples for the block of pixels; selecting a subset of the set of potential reference samples to be used as reference samples for the block of pixels; and using the selected reference samples to determine a DC prediction value for the block of pixels. A prediction error is determined for a pixel in the block of pixels on the basis of the DC prediction value. The decoding comprises receiving an encoded block of pixels; determining reference samples for the encoded block of pixels; and using the determined reference samples to define a DC prediction value for the block of pixels. A prediction error is received for a pixel of the encoded block of pixels. The pixel value is reconstructed on the basis of the DC prediction value.

14 Claims, 8 Drawing Sheets

METHOD FOR CODING AND AN APPARATUS BASED ON A DC PREDICTION VALUE

TECHNICAL FIELD

There is provided a method for encoding, a method for decoding, an apparatus, computer program products, an encoder and a decoder.

BACKGROUND INFORMATION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section A video codec may comprise an encoder which transforms input video into a compressed representation suitable for storage and/or transmission and a decoder that can uncompress the compressed video representation back into a viewable form, or either one of them. The encoder may discard some information in the original video sequence in order to represent the video in a more compact form, for example at a lower bit rate.

Many hybrid video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship, for example by using pixel values around the block to be coded in a specified manner.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This may be accomplished by transforming the difference in pixel values using a specified transform. This transform may be e.g. a Discrete Cosine Transform (DCT) or a variant thereof. After transforming the difference, the transformed difference may be quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate).

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

In some video codecs, such as HM4 (High Efficiency Video Coding Working Draft 4), video pictures may be divided into coding units (CU) covering the area of a picture. A coding unit consists of one or more prediction units (PU) defining the prediction process for the samples within the coding unit and one or more transform units (TU) defining the prediction error coding process for the samples in the coding unit. A coding unit may consist of a square block of samples with a size selectable from a predefined set of possible coding unit sizes. A coding unit with the maximum allowed size can be named as a largest coding unit (LCU) and the video picture may be divided into non-overlapping largest coding units. A largest coding unit can further be split into a combination of smaller coding units, e.g. by recursively splitting the largest coding unit and resultant coding units. Each resulting coding unit may have at least one prediction unit and at least one transform unit associated with it. Each prediction unit and transform unit can further be split into smaller prediction units and transform units in order to increase granularity of the prediction and prediction error coding processes, respectively. Each prediction unit may have prediction information associated with it defining what kind of a prediction is to be applied for the pixels within that prediction unit (e.g. motion vector information for inter predicted prediction units and intra prediction directionality information for intra predicted prediction units). Similarly, each transform unit may be associated with information describing the prediction error decoding process for samples within the transform unit (including e.g. discrete cosine transform (DCT) coefficient information). It may be signalled at coding unit level whether prediction error coding is applied or not for each coding unit. In the case there is no prediction error residual associated with the coding unit, it can be considered there are no transform units for the coding unit. The division of the image into coding units, and division of coding units into prediction units and transform units may be signalled in the bitstream allowing the decoder to reproduce the intended structure of these units.

In some video codecs, motion information is indicated by motion vectors associated with each motion compensated image block. These motion vectors represent the displacement of the image block in the picture to be coded (in the encoder) or decoded (at the decoder) and the prediction source block in one of the previously coded or decoded images (or pictures). In order to represent motion vectors efficiently, motion vectors may be coded differentially with respect to block specific predicted motion vector. In some video codecs, the predicted motion vectors are created in a predefined way, for example by calculating the median of the encoded or decoded motion vectors of the adjacent blocks.

Another way to create motion vector predictions is to generate a list of candidate predictions from adjacent blocks and/or co-located blocks in temporal reference pictures and signalling the chosen candidate as the motion vector predictor. In addition to predicting the motion vector values, the reference index of previously coded/decoded picture can be predicted. The reference index may be predicted from adjacent blocks and/or co-located blocks in a temporal reference picture. Moreover, some high efficiency video codecs employ an additional motion information coding/decoding mechanism, often called merging/merge mode, where all the motion field information, which includes motion vector and corresponding reference picture index for each available reference picture list, is predicted and used without any modification or correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In some video codecs the prediction residual after motion compensation is first transformed with a transform kernel (like DCT) and then coded. The reason for this is that often there still exists some correlation among the residual and transform can in many cases help reduce this correlation and provide more efficient coding.

Some video encoders utilize Lagrangian cost functions to find optimal coding modes, e.g. the desired Macroblock mode and associated motion vectors. This kind of cost function uses a weighting factor $\lambda$, to tie together the (exact or estimated) image distortion due to lossy coding methods and the (exact or estimated) amount of information that is required to represent the pixel values in an image area:

$$C = D + \lambda R \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

In some video codecs the intra coded image blocks are predicted from the neighboring already coded or decoded image samples. These samples may be called as reference samples. The prediction may be performed either by directionally extrapolating reference samples to cover the area of the image block to be predicted ("directional prediction") or by utilizing the average of the reference samples as a prediction for the image block to be predicted ("DC prediction").

When it comes to the DC prediction, there are several issues which may be addressed. Firstly, calculating the average of a large number of reference samples to come up with a single value representing the prediction for a whole image block may be a complex operation considering the accuracy of the prediction. Secondly, the neighboring samples above and left of the predicted block are used as reference samples, wherein the center of mass 600 for the reference samples for the DC prediction is very close to the top-left corner of the block, as shown in FIG. 6a. Thus, the prediction obtained with this kind of DC prediction may not provide a good estimate of the actual expected average of the image samples within the prediction block.

SUMMARY

The present invention introduces a method for generating a DC prediction signal for an image block utilizing a specific subset of the reference samples. The subset may be selected symmetrically from the reference samples above and left of the block in a way the average coordinates of the selected reference samples reside closer to the center of the predicted block than the average coordinates of the full set of boundary pixels on the top and left borders of the predicted block.

According to a first aspect of the present invention there is provided a method comprising:

receiving a block of pixels;
determining a set of potential reference samples for the block of pixels;
selecting a subset of the set of potential reference samples to be used as reference samples for the block of pixels; and
using the selected reference samples to determine a DC prediction value for the block of pixels.

In some embodiments the method further comprises determining a prediction error for a pixel in the block of pixels on the basis of the DC prediction value and the value of the pixel in the block of pixels.

According to a second aspect of the present invention there is provided a method comprising:

receiving an encoded block of pixels;
determining a set of potential reference samples for the block of pixels;
selecting a subset of the set of potential reference samples to be used as reference samples for the block of pixels;
determining reference samples for the encoded block of pixels;
using the determined reference samples to define a DC prediction value for the block of pixels;
receiving a prediction error for a pixel of the encoded block of pixels; and
reconstructing the pixel value on the basis of the DC prediction value and the prediction error.

According to a third aspect of the present invention there is provided an apparatus comprising a processor and a memory including computer program code, the memory and the computer program code configured to, with the processor, cause the apparatus to:

receive a block of pixels;
determine a set of potential reference samples for the block of pixels;
select a subset of the set of potential reference samples to be used as reference samples for the block of pixels;
use the selected reference samples to determine a DC prediction value for the block of pixels; and
determine a prediction error for a pixel in the block of pixels on the basis of the DC prediction value and the value of the pixel in the block of pixels.

According to a fourth aspect of the present invention there is provided an apparatus comprising a processor and a memory including computer program code, the memory and the computer program code configured to, with the processor, cause the apparatus to:

receive an encoded block of pixels;
determine a set of potential reference samples for the block of pixels;
select a subset of the set of potential reference samples to be used as reference samples for the block of pixels;
determine reference samples for the encoded block of pixels;
use the determined reference samples to define a DC prediction value for the block of pixels;
receive a prediction error for a pixel of the encoded block of pixels; and
reconstruct the pixel value on the basis of the DC prediction value and the prediction error.

According to a fifth aspect of the present invention there is provided a storage medium having stored thereon a computer executable program code for use by an encoder, said program code comprises instructions for:

receiving a block of pixels;
determining a set of potential reference samples for the block of pixels;

selecting a subset of the set of potential reference samples to be used as reference samples for the block of pixels;

using the selected reference samples to determine a DC prediction value for the block of pixels; and determining a prediction error for a pixel in the block of pixels on the basis of the DC prediction value and the value of the pixel in the block of pixels.

According to a sixth aspect of the present invention there is provided a storage medium having stored thereon a computer executable program code for use by a decoder, said program code comprises instructions for:

receiving an encoded block of pixels;

determining a set of potential reference samples for the block of pixels;

selecting a subset of the set of potential reference samples to be used as reference samples for the block of pixels;

determining reference samples for the encoded block of pixels;

using the determined reference samples to define a DC prediction value for the block of pixels;

receiving a prediction error for a pixel of the encoded block of pixels; and reconstructing the pixel value on the basis of the DC prediction value and the prediction error.

According to a seventh aspect of the present invention there is provided an apparatus comprising:

means for receiving a block of pixels;

means for determining a set of potential reference samples for the block of pixels;

means for selecting a subset of the set of potential reference samples to be used as reference samples for the block of pixels;

means for using the selected reference samples to determine a DC prediction value for the block of pixels; and means for determining a prediction error for a pixel in the block of pixels on the basis of the DC prediction value and the value of the pixel in the block of pixels.

According to an eighth aspect of the present invention there is provided an apparatus comprising:

means for receiving an encoded block of pixels;

means for determining a set of potential reference samples for the block of pixels;

means for selecting a subset of the set of potential reference samples to be used as reference samples for the block of pixels;

means for determining reference samples for the encoded block of pixels;

means for using the determined reference samples to define a DC prediction value for the block of pixels;

means for receiving a prediction error for a pixel of the encoded block of pixels; and means for reconstructing the pixel value on the basis of the DC prediction value and the prediction error.

DESCRIPTION OF THE DRAWINGS

For better understanding of the present invention, reference will now be made by way of example to the accompanying drawings in which:

FIG. 5 shows a flow diagram showing the operation of an embodiment of the invention with respect to the encoder as shown in FIG. 4a;

DETAILED DESCRIPTION

Figure 1:
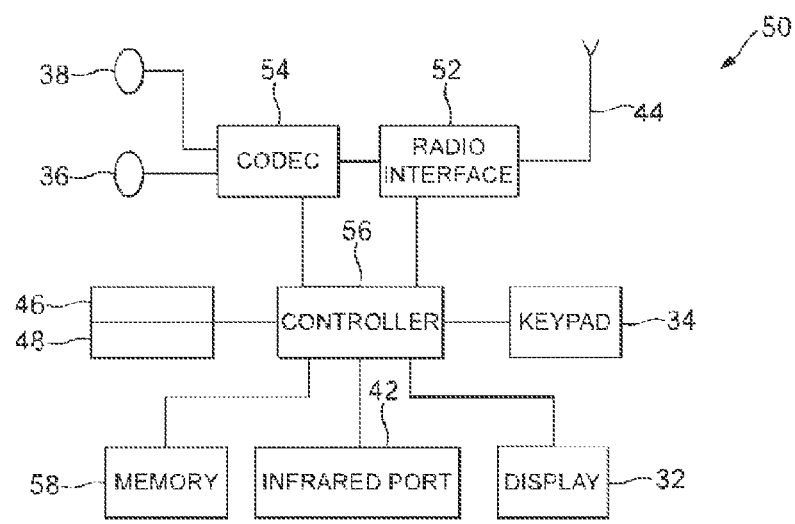
FIG. 1 shows schematically an electronic device employing some embodiments of the invention.
Figure 2:
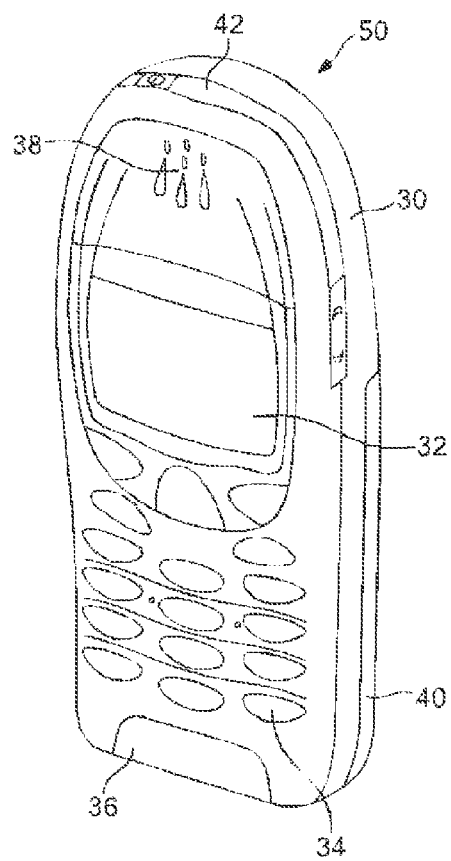
FIG. 2 shows schematically a user equipment suitable for employing some embodiments of the invention.

The following describes in further detail suitable apparatus and possible mechanisms for the provision of improving the prediction accuracy and hence possibly reducing information to be transmitted in video coding systems. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
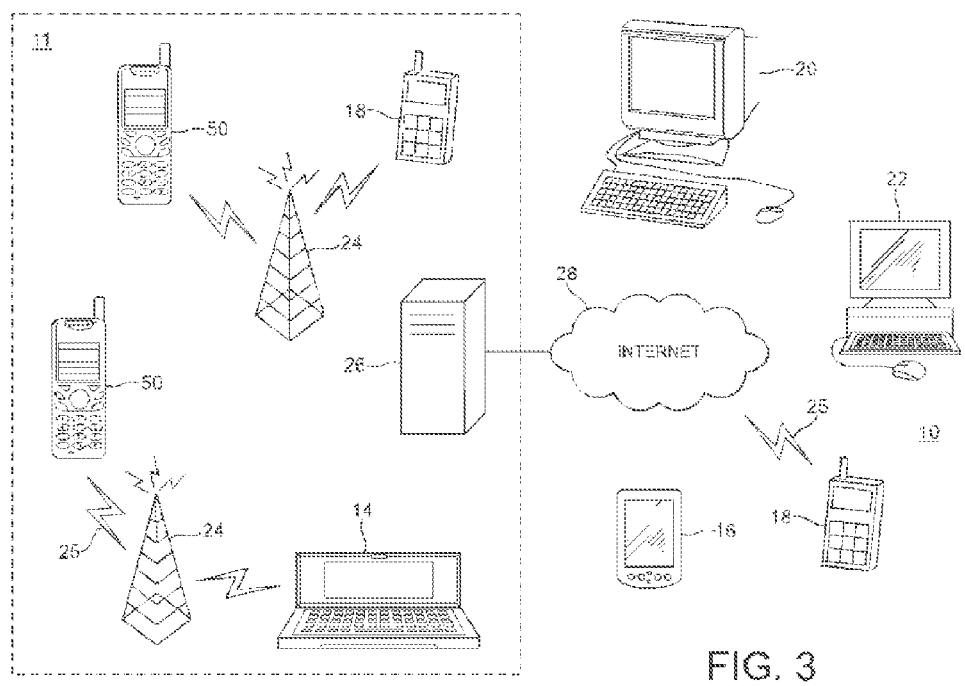
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatuses may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
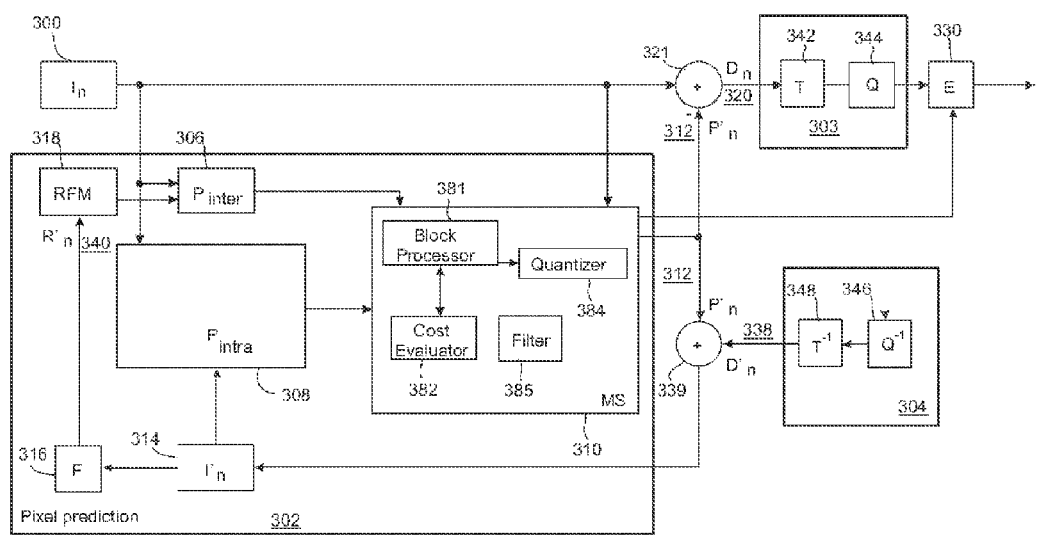
FIG. 4a shows schematically an embodiment of the invention as incorporated within an encoder.
Figure 5:
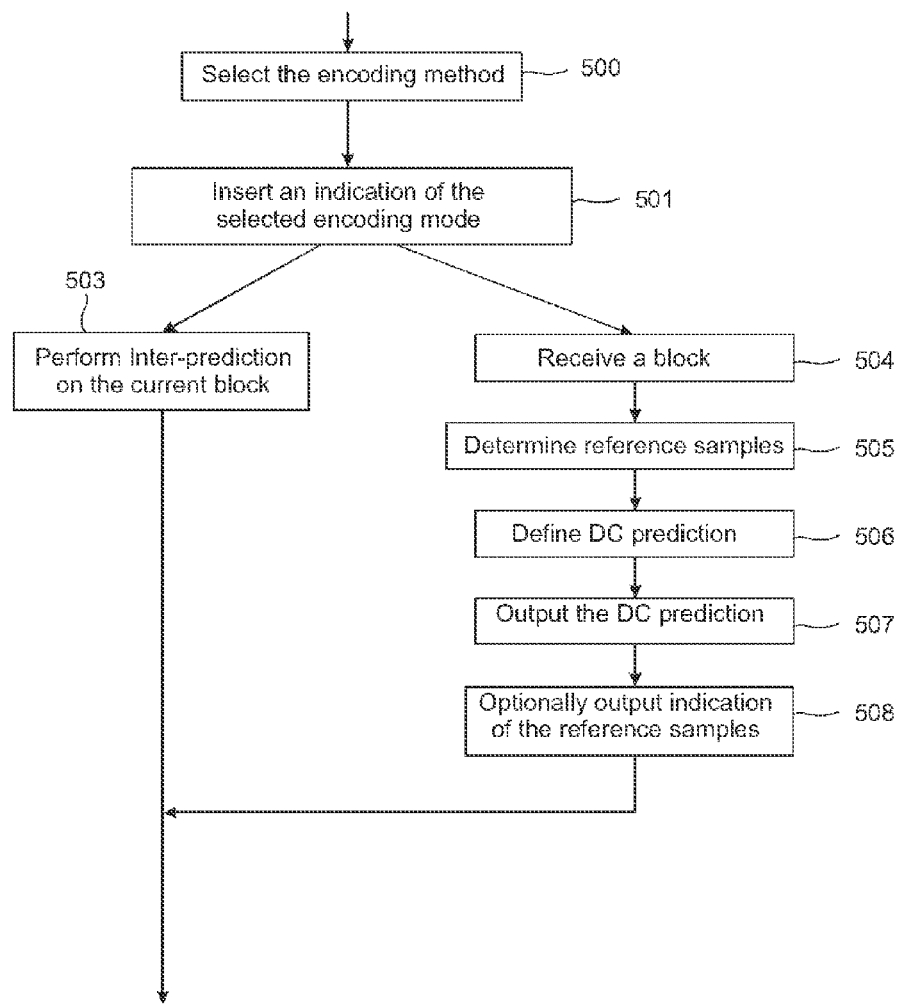

With respect to FIG. 4a, a block diagram of a video encoder suitable for carrying out embodiments of the invention is shown. Furthermore, with respect to FIG. 5, the operation of the encoder exemplifying embodiments of the invention specifically with respect to the DC prediction is shown as a flow diagram.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a filter 316, and a reference frame memory 318. The encoder may further comprise an entropy encoder 330 for entropy encoding the bit stream.

Figure 4B:
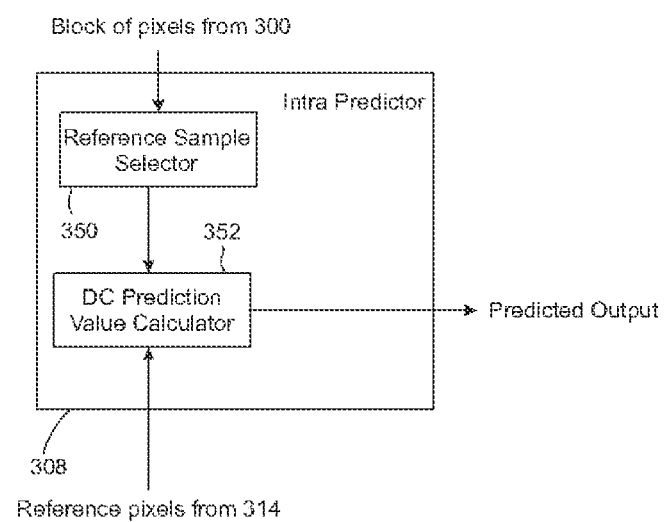
FIG. 4b shows schematically an embodiment of an intra predictor according to some embodiments of the invention.

FIG. 4b depicts an embodiment of the intra predictor 308. The intra predictor 308 comprises a reference sample selector 350 for selecting reference samples, and a prediction calculation element 352 for calculating or otherwise determining the DC prediction.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction mode. Hence, each mode may perform the intra-prediction and provide the predicted signal to the mode selector 310. The mode selector 310 also receives a copy of the image 300.

The mode selector 310 determines (block 500 in FIG. 5) which encoding mode to use to encode the current block. If the mode selector 310 decides to use an inter-prediction mode (block 503) it will pass the output of the inter-predictor 306 to the output of the mode selector 310. If the mode selector 310 decides to use an intra-prediction mode (blocks 504-508) it will pass the output of one of the intra-predictor modes to the output of the mode selector 310.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The pixel predictor 302 may also comprise a filter 385 to filter the predicted values before outputting them from the pixel predictor 302.

The operation of the prediction error encoder 303 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macroblock (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter parameters.

Figure 6A:
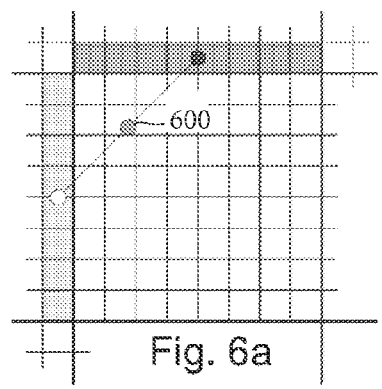
FIG. 6a illustrates an example of a center of mass resulting from using two sets of reference samples from neighboring blocks.
Figure 6B:
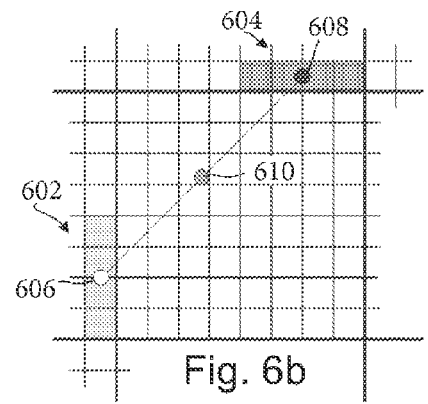
FIG. 6b illustrates an example of a center of mass resulting from using two subsets of reference samples selected for intra prediction according to an embodiment of the present invention.

In the following the operation of an example embodiment of the intra predictor 308 will be described in more detail. In an example embodiment the DC prediction is implemented as follows. The intra predictor 308 receives 504 the current block for intra prediction. The reference sample selector 350 selects 505 the reference samples from one, two or more of the neighboring blocks which have already been encoded for forming a prediction of the current block. In this example embodiment the rightmost half of the reference samples above and the bottom half of the reference samples left of the prediction block are selected, as illustrated in FIG. 6b. In FIG. 6b the shadowed sets of pixels 602, 604 illustrate the selected samples, and the circles 606, 608, 610 illustrate the center of the first subset i.e. the selected pictures from the neighboring block on one side of the current block (e.g. the block to the left), the center of the second subset i.e. the selected pictures from the neighboring block on another side of the current block (e.g. the block above), and the center of mass of the samples of the combination of the first and the second subset, respectively.

The prediction calculation element 352 gets information of the selected reference samples. The prediction calculation element 352 obtains the values of the selected reference samples and determines 506 a DC prediction e.g. by calculates an average value of the selected reference samples or another value on the basis of the selected reference samples. The prediction calculation element 352 provides 507 the calculated value(s) as the output of the intra predictor 308 to the mode selector 310. The prediction calculation element 352 may provide the same value (DC prediction) for each pixel of the current block or the prediction calculation element 352 may provide a different DC prediction value for some pixels of the current block. This way the computational complexity of generating the DC prediction may be reduced compared to the use of including all the neighboring reference samples in the process, while the accuracy of the prediction may be increased as the selected subset of reference samples may provide a statistically better estimate for the average sample value of the prediction block. In some embodiments the computational complexity is roughly halved.

The intra predictor 308 may also provide 508 an indication of the selected reference samples to the mode selector which may encode the indication to the bitstream in which the prediction information is encoded, or to a separate bitstream.

An example implementation of the invention can be defined algorithmically for a square block of size nS×nS pixels as follows:

$$predSamples[x, y] = \left( \sum_{x'=nH}^{nS-1} p[x', -1] + \sum_{y'=nH}^{nS-1} p[-1, y'] + nH \right) >> k, \quad (2)$$

$$x, y = 0 \ldots nS - 1$$

where nH is half of nS, p represents the array of the reference pixels and k=log 2(nS). In other words, when nH=nS/2, the reference pixels (samples) selected for the calculation of the DC prediction are from the lower half of the rightmost column of the neighbouring block on the left side of the current block and from the rightmost half of the lowest row of the neighbouring block above the current block. In another example embodiment nH=(¾)nS, wherein the last quarter of the rightmost column of the block on the right and the last quarter of the lowest row of the upper block are selected for the calculation. However, these are only non-limiting examples and also other rules for selecting the reference pixels may be applied. The reference sample selector 350 may use the equation (2) in the selection of the reference samples. The reference sample selector 350 may provide e.g. indices of the selected reference samples to the prediction calculation element 352 or the reference sample selector 350 may obtain from the reference frame memory 316 the values of the selected samples and provide the values to the prediction calculation element 352 which may then read the values of the selected samples from the reference frame memory 316 and determine the DC prediction.

In some example embodiments the reference sample selector 350 may always use the same reference sample selection for each block to be intra predicted wherein the selection may be implemented as a fixed set of parameters or indices which define the pixels in the neighboring block to be used as reference samples. In some other embodiments the reference sample selector 350 may comprise an image analyzer which may analyze the contents of the image or the current block to determine which pixels of one or more of the neighboring blocks to use as reference pixels. There may also be other possibilities to determine the reference pixels for the current block.

In some example embodiments the calculation of the DC prediction can further be combined with smoothing of the prediction block boundaries. The combined process of some example embodiments can be described as:

$$DCVal = \left( \sum_{x'=nH}^{nS-1} p[x', -1] + \sum_{y'=nH}^{nS-1} p[-1, y'] + nH \right) >> k \quad (3)$$

The smoothing may include modifying some samples e.g. by using the following equations:

predSamples[0,0]=($p[-1,0]+2*DCVal+p[0,-1]+2$)>>2 predSamples[x,0]=($p[x,-1]+3*DCVal+2$)>>2,x=1 ... nS-1 predSamples[0,y]=($p[-1,y]+3*DCVal+2$)>>2,y=1 ... nS-1 predSamples[x,y]=DCVal,x,y=1 ... nS-1

Hence, a slightly amended DC prediction is used for pixels at locations [0,0], [x,0],[0,y] and [x,y] of the current block.

The DCVal parameter can be calculated in different ways in alternative embodiments of the invention. Some possibilities include the following:

$$DCVal = \quad (4)$$
$$\left( \sum_{x'=nH+1}^{nS-1} p[x', -1] + \sum_{y'=nH+1}^{nS-1} p[-1, y'] + 2p[-1, -1] + nH \right) >> k$$

and $$DCVal = \left( \sum_{x'=1}^{nS/4} p[4x'-1, -1] + \sum_{y'=1}^{nS/4} p[-1, 4y'-1] + nH/2 \right) >> (k-1) \quad (5)$$

In the case the predicted block is not a square, the method can select all the samples on the shorter boundary (having smaller number of potential reference samples than the other boundary) and the same number of samples on the other boundary. For example, for a block of size nS×mS, nS<mS, the DCVal parameter can be generated using nS samples on both horizontal and vertical boundary as:

$$DCVal = \left( \sum_{x'=0}^{nS-1} p[x', -1] + \sum_{y'=mS-nS}^{mS-1} p[-1, y'] + nS \right) >> (k+1) \quad (6)$$

The mode selector 310 may provide the calculated DC prediction values to the first summing device 321 which may determine the difference between the DC prediction and the actual value of the pixel. This difference represents a prediction error and may be encoded together with the DC prediction so that a decoder can perform the reversed operation to obtain the reconstructed pixel values by using the DC prediction and the prediction error.

As was mentioned above, the prediction calculation element 352 may use the same DC prediction for each pixel of the current block or the prediction calculation element 352 may use a different DC prediction (e.g. the smoothened values) for some pixels of the current block. In some embodiments the prediction calculation element 352 may perform the calculation of the DC prediction for each pixel of the current block, wherein the first summing device 321 may use a different DC prediction for each pixel when determining the prediction error.

In some embodiments the DC prediction value is not assigned to all samples but to a subset of all the samples within the prediction block.

The invention can also be implemented in various other ways. For example, the selected subset of reference samples can vary depending on the size of the predicted block, the type of the image or a slice of the image, selected quantization parameter for the transform unit, or other parameters.

Figure 6C:
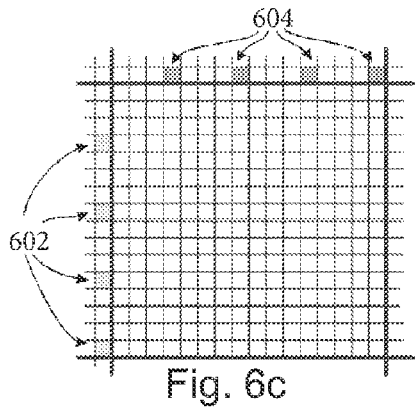
FIG. 6c illustrates another example of a selection of reference samples for intra prediction according to an embodiment of the present invention.
Figure 6D:
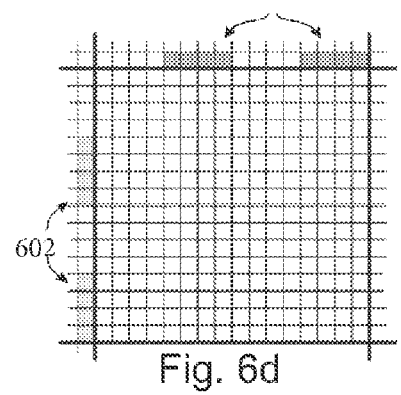
FIG. 6d illustrates yet another example of a selection of reference samples for intra prediction according to an embodiment of the present invention.

Different methods can be used to select the subset of reference samples generating the DC prediction value, such as using every nth reference sample. FIG. 6c illustrates the case in which n=4. In some embodiments sets of n consecutive reference samples are used and m samples inbetween the sets are skipped. FIG. 6d illustrates the case of n=4, m=4)

In some embodiments one or more sets of potential reference samples may be defined. The set of potential reference samples may include, for example, the adjacent pixels of the neighboring blocks of the current block which have already been encoded/decoded. For example in the situation illustrated in FIG. 6a, there are two sets of potential reference samples. The first set includes the pixels 612 of the rightmost column of the block on the left side of the current block. Respectively, the second set includes the pixels 614 of the lowest row of the block above the current block. The subsets i.e. the selected reference samples may be selected from the first set of potential reference pixels and/or from the second set of potential reference pixels. In some embodiments all reference samples of one or more of the sets of potential reference samples may be selected whereas one or more of the reference values of at least one set of potential reference values are excluded from the selection. In other words, using the example of FIG. 6a, all the samples of the first set of potential reference samples and only a part of the second set of potential reference samples might be selected, or vice versa.

It should be noted here that the above disclosed examples only illustrate how the one or more sets of potential reference samples could be determined but within the scope of the present invention were can also be other ways to determine the set(s) of potential reference samples and the selection of the reference samples among the set(s) potential reference samples.

The selected subset of reference samples can be signaled in the coded bitstream.

The set of reference samples used in the prediction process can include samples from different neighboring blocks at different distances from the borders of the prediction block. For example, the top-left sample p[−1,−1] can be included in the set of reference samples used to generate the DC prediction value.

In some embodiments the method can be applied differently to different color planes (e.g. luminance and chrominance) or the method can be switched on or off for specific color planes or auxiliary video pictures, such as depth pictures in a 3D video sequence.

The method can be applied to blocks that are transform coded or blocks that are not transform coded. None, some or all the reference samples can undergo pre-processing before the prediction process. Furthermore, none, some or all the input samples to the filter can be interpolated samples (e.g. output samples from a sub-pixel interpolation process).

Some reference samples can be given more weight, less weight or removed completely from the process of calculating the DC prediction value always or depending on different criteria such as the value of the reference sample compared to value of another reference sample or values of a set of reference samples.

It is also possible to filter the predicted sample values after the DC prediction process.

The sample selection process can be different for reference samples in different borders of the block of samples.

The method can be applied to both square and non-square image blocks. In the case of non-square blocks the selection process can select all reference samples on one of the block borders and the same number of samples on the other boundary.

The sample selection process can select a different number of samples on different block boundaries.

Although the embodiments above have been described with respect to the size of the macroblock being 16×16 pixels, it would be appreciated that the methods and apparatus described may be configured to handle macroblocks of different pixel sizes.

Figure 7:
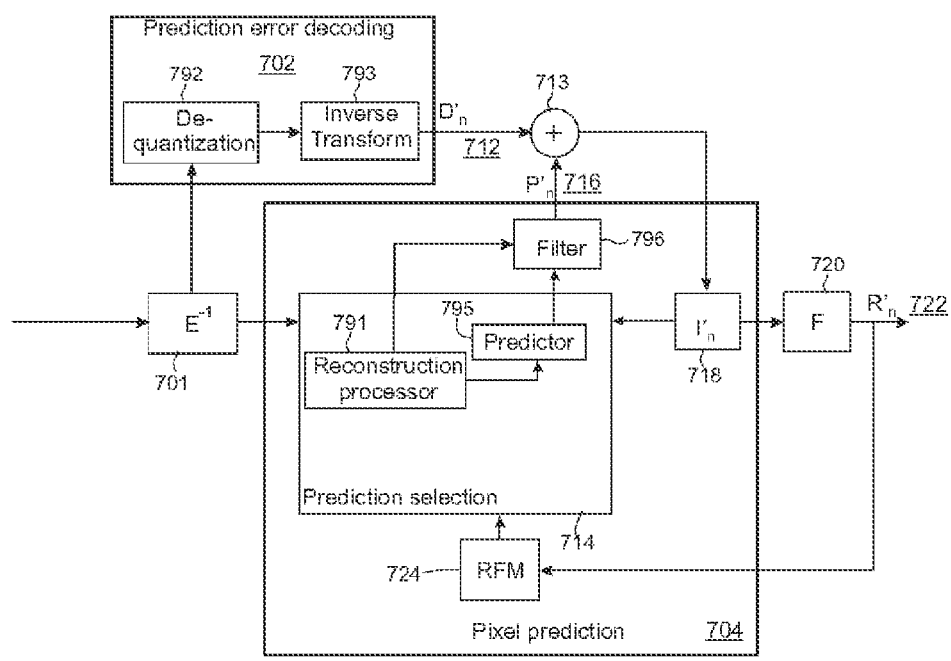
FIG. 7 shows schematically an embodiment of the invention as incorporated within a decoder.

In the following the operation of an example embodiment of the decoder 600 is depicted in more detail with reference to FIG. 7.

Figure 8:
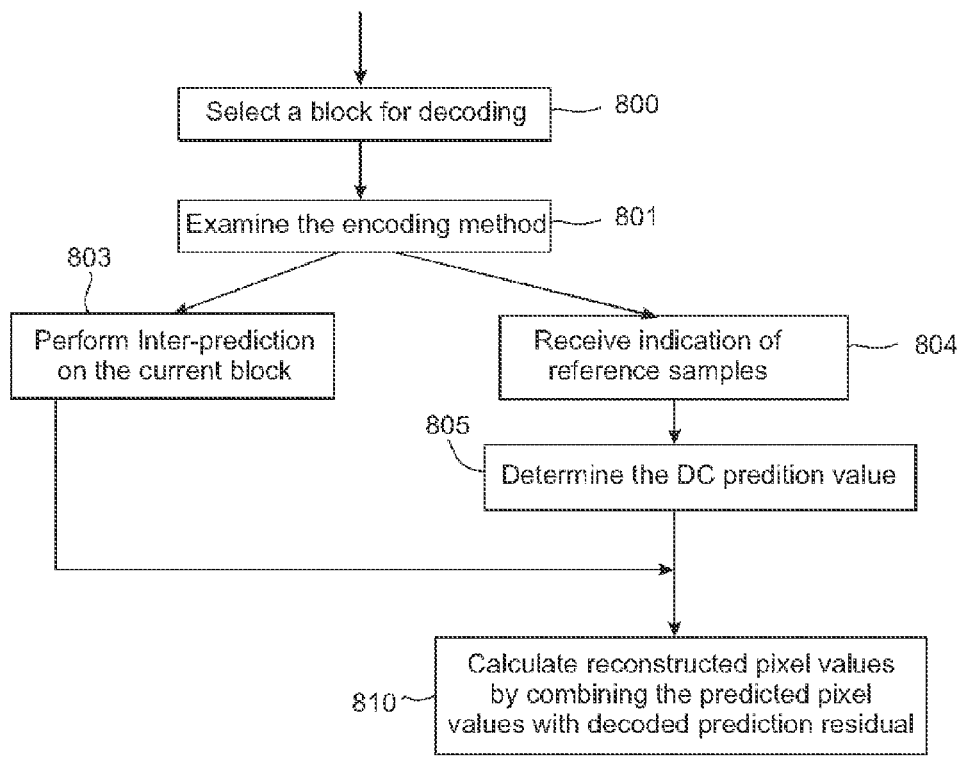
FIG. 8 shows a flow diagram of showing the operation of an embodiment of the invention with respect to the decoder shown in FIG. 7.

At the decoder side similar operations are performed to reconstruct the image blocks. FIG. 7 shows a block diagram of a video decoder 700 suitable for employing embodiments of the invention and FIG. 8 shows a flow diagram of an example of a method in the video decoder. The bitstream to be decoded may be received 800 from the encoder, from a network element, from a storage medium or from another source. The decoder is aware of the structure of the bitstream so that it can determine the meaning of the entropy coded codewords and may decode the bitstream by an entropy decoder 701 which performs entropy decoding on the received signal. The entropy decoder thus performs the inverse operation to the entropy encoder 330 of the encoder described above. The entropy decoder 701 outputs the results of the entropy decoding to a prediction error decoder 702 and a pixel predictor 704.

In some embodiments the entropy coding may not be used but another channel encoding may be in use, or the encoded bitstream may be provided to the decoder 700 without channel encoding. The decoder 700 may comprise a corresponding channel decoder to obtain the encoded codewords from the received signal.

The pixel predictor 704 receives the output of the entropy decoder 701. The output of the entropy decoder 701 may include an indication on the prediction mode used in encoding the current block. A predictor selector 714 within the pixel predictor 704 determines that an intra-prediction, an inter-prediction, or interpolation operation is to be carried out. The predictor selector 714 may furthermore output a predicted representation of an image block 716 to a first combiner 713. The predicted representation of the image block 716 is used in conjunction with the reconstructed prediction error signal 712 to generate a preliminary reconstructed image 718. The preliminary reconstructed image 718 may be used in the predictor 714 or may be passed to a filter 720. The filter 720, if used, applies a filtering which outputs a final reconstructed signal 722. The final reconstructed signal 722 may be stored in a reference frame memory 724, the reference frame memory 724 further being connected to the predictor 714 for prediction operations.

In the case of inter-prediction the pixel predictor 704 may also receive refinement indication.

Also the prediction error decoder 702 receives the output of the entropy decoder 701. A dequantizer 792 of the prediction error decoder 702 may dequantize the output of the entropy decoder 701 and the inverse transform block 793 may perform an inverse transform operation to the dequantized signal output by the dequantizer 792. The output of the entropy decoder 701 may also indicate that prediction error signal is not to be applied and in this case the prediction error decoder produces an all zero output signal.

The decoder selects the 16×16 pixel residual macroblock to reconstruct. The selection of the 16×16 pixel residual macroblock to be reconstructed is shown in step 800. This residual macroblock is also called as a current block.

The decoder may receive information on the encoding mode used in encoding of the current block. The indication is decoded, when necessary, and provided to the reconstruction processor 791 of the prediction selector 714. The reconstruction processor 791 examines the indication (block 801 in FIG. 8) and selects one of the intra-prediction modes (blocks 804-805), if the indication indicates that the block has been encoded using intra-prediction, or the inter-prediction mode (block 803), if the indication indicates that the block has been encoded using inter-prediction.

If the current block has been encoded using intra-prediction, the pixel predictor 704 may operate as follows. The pixel predictor 704 receives 804 indication of reference samples used in the intra-prediction of the current block. The indication may comprise indices of the reference pixels, or it may be a parameter which indicates the reference samples used in the intra prediction. For example, the parameter may indicate the equation to determine the indices of the reference samples (e.g. predSamples[x,y]). The equation may be similar to the equation (2), for example. However, in some embodiments the subset of the reference samples, i.e. the samples selected as reference samples by the encoder 300 may not change wherein the decoder 700 may be configured to use reference samples at the same locations of the neighboring blocks (i.e. the same sample indices predSamples[x,y]) for all intra-predicted blocks. The reconstruction processor 791 of the pixel predictor 704 may be used to obtain information of the reference samples and provide it to the predictor 795.

When the reconstruction processor 791 is aware of the reference samples the predictor 795 may determine 805 the DC prediction value or values for the current block of pixels. The reconstruction processor 791 may provide the DC prediction value either directly to the first combiner 713 or to the filter 796 which may filter the DC prediction value and provide the filtered DC prediction value to the first combiner 713.

The first combiner 713, as already described above, combines 810 the prediction error and the DC prediction to obtain reconstructed pixel values of the current block. These reconstructed pixel values may be stored as a preliminary reconstructed image 718. The preliminary reconstructed image 718 may be used in the predictor 714 or may be passed to a filter 720. The filter 720, if used, applies a filtering which outputs a final reconstructed signal 722. The final reconstructed signal 722 may be stored in a reference frame memory 724, the reference frame memory 724 further being connected to the predictor 714 for prediction operations.

The procedure may be repeated until all the entropy coded codewords have been decoded and converted to reconstructed coefficients.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

In some embodiments a method comprises:

receiving a block of pixels;

determining a set of potential reference samples for the block of pixels;

selecting a subset of the set of potential reference samples to be used as reference samples for the block of pixels; and using the selected reference samples to determine a DC prediction value for the block of pixels.

In some embodiments the method further comprises determining a prediction error for a pixel in the block of pixels on the basis of the DC prediction value and the value of the pixel in the block of pixels.

In some embodiments the method further comprises selecting the reference samples among pixels of encoded neighboring blocks of the block of pixels.

In some embodiments the set of potential reference samples for the block of pixels comprises the pixels of the encoded neighboring block which are adjacent to the block of pixels.

In some embodiments the set of potential reference samples for the block of pixels comprises a part of the pixels of the encoded neighboring block which are adjacent to the block of pixels.

In some embodiments the selected reference samples contain half of the pixels of the encoded neighboring block which are adjacent to the block of pixels.

In some embodiments every other pixel of the encoded neighboring block which are adjacent to the block of pixels are selected as reference samples.

In some embodiments the samples are selected for a square block of size nS×nS pixels as follows:

$$predSamples[x, y] = \left( \sum_{x'=nH}^{nS-1} p[x', -1] + \sum_{y'=nH}^{nS-1} p[-1, y'] + nH \right) >> k,$$

$$x, y = 0 \ldots nS - 1$$

where nH=nS/2, p represents the array of the reference pixels and k=log 2(nS).

In some embodiments the DC prediction is calculated as follows:

$$DCVal = \left( \sum_{x'=nH}^{nS-1} p[x', -1] + \sum_{y'=nH}^{nS-1} p[-1, y'] + nH \right) \gg k, x, y = 0 \ldots nS-1$$

where nH=nS/2, p represents the array of the reference pixels and k=log 2(nS).

In some embodiments the predicted block differs from a square, wherein the method comprises selecting all samples on a boundary having smaller number of potential reference samples than another boundary, and selecting the same number of samples on the other boundary.

In some embodiments the predicted block is of size nS×mS, nS<mS, wherein the DC prediction value is generated using nS samples on both horizontal and vertical boundary as $$DCVal = \left( \sum_{x'=0}^{nS-1} p[x', -1] + \sum_{y'=mS-nS}^{mS-1} p[-1, y'] + nS \right) \gg (k+1).$$

In some embodiments a method comprises:
receiving an encoded block of pixels;
determining a set of potential reference samples for the block of pixels;
selecting a subset of the set of potential reference samples to be used as reference samples for the block of pixels;
determining reference samples for the encoded block of pixels;
using the determined reference samples to define a DC prediction value for the block of pixels;
receiving a prediction error for a pixel of the encoded block of pixels; and
reconstructing the pixel value on the basis of the DC prediction value and the prediction error.

In some embodiments the method further comprises selecting the reference samples among pixels of encoded neighboring blocks of the block of pixels.

In some embodiments the set of potential reference samples for the block of pixels comprises the pixels of the decoded neighboring block which are adjacent to the block of pixels.

In some embodiments the set of potential reference samples for the block of pixels comprises a part of the pixels of the decoded neighboring block which are adjacent to the block of pixels.

In some embodiments the selected reference samples contain half of the pixels of the decoded neighboring block which are adjacent to the block of pixels.

In some embodiments every other pixel of the decoded neighboring block which are adjacent to the block of pixels are selected as reference samples.

In some embodiments the samples are selected for a square block of size nS×nS pixels as follows:

$$predSamples[x, y] = \left( \sum_{x'=nH}^{nS-1} p[x', -1] + \sum_{y'=nH}^{nS-1} p[-1, y'] + nH \right) \gg k,$$

$$x, y = 0 \ldots nS-1$$

where nH=nS/2, p represents the array of the reference pixels and k=log 2(nS).

In some embodiments the DC prediction is calculated as follows:

$$DCVal = \left( \sum_{x'=nH}^{nS-1} p[x', -1] + \sum_{y'=nH}^{nS-1} p[-1, y'] + nH \right) \gg k, x, y = 0 \ldots nS-1$$

where nH=nS/2, p represents the array of the reference pixels and k=log 2(nS).

In some embodiments the predicted block differs from a square, wherein the method comprises selecting all samples on a boundary having smaller number of potential reference samples than another boundary, and selecting the same number of samples on the other boundary.

In some embodiments the predicted block is of size nS×mS, nS<mS, wherein the DC prediction value is generated using nS samples on both horizontal and vertical boundary as $$DCVal = \left( \sum_{x'=0}^{nS-1} p[x', -1] + \sum_{y'=mS-nS}^{mS-1} p[-1, y'] + nS \right) \gg (k+1).$$

In some embodiments an apparatus comprises a processor and a memory including computer program code, the memory and the computer program code configured to, with the processor, cause the apparatus:
receive a block of pixels;
determine a set of potential reference samples for the block of pixels;
select a subset of the set of potential reference samples to be used as reference samples for the block of pixels;
use the selected reference samples to determine a DC prediction value for the block of pixels.

In some embodiments the memory and the computer program code are configured to, with the processor, cause the apparatus to determine a prediction error for a pixel in the block of pixels on the basis of the DC prediction value and the value of the pixel in the block of pixels.

In some embodiments the memory and the computer program code are configured to, with the processor, cause the apparatus to select the reference samples among pixels of encoded neighboring blocks of the block of pixels.

In some embodiments the memory and the computer program code are configured to, with the processor, cause the apparatus to select the reference samples among pixels of encoded neighboring blocks of the block of pixels.

In some embodiments the set of potential reference samples for the block of pixels comprises the pixels of the encoded neighboring block which are adjacent to the block of pixels.

In some embodiments the set of potential reference samples for the block of pixels comprises a part of the pixels of the encoded neighboring block which are adjacent to the block of pixels.

In some embodiments the selected reference samples contain half of the pixels of the encoded neighboring block which are adjacent to the block of pixels.

In some embodiments every other pixel of the encoded neighboring block which are adjacent to the block of pixels are selected as reference samples.

In some embodiments the memory and the computer program code are configured to, with the processor, cause the apparatus to select the samples for a square block of size nS×nS pixels as follows:

$$predSamples[x, y] = \left(\sum_{x'=nH}^{nS-1} p[x', -1] + \sum_{y'=nH}^{nS-1} p[-1, y'] + nH\right) \gg k,$$

$$x, y = 0 \ldots nS - 1$$

where nH=nS/2, p represents the array of the reference pixels and k=log 2(nS).

In some embodiments the memory and the computer program code are configured to, with the processor, cause the apparatus to calculate the DC prediction as follows:

$$DCVal = \left(\sum_{x'=nH}^{nS-1} p[x', -1] + \sum_{y'=nH}^{nS-1} p[-1, y'] + nH\right) \gg k, x, y = 0 \ldots nS - 1$$

where nH=nS/2, p represents the array of the reference pixels and k=log 2(nS).

In some embodiments the predicted block differs from a square, wherein the memory and the computer program code are configured to, with the processor, cause the apparatus to select all samples on a boundary having smaller number of potential reference samples than another boundary, and to select the same number of samples on the other boundary.

In some embodiments the predicted block is of size nS×mS, nS<mS, wherein the memory and the computer program code are configured to, with the processor, cause the apparatus to generate the DC prediction value using nS samples on both horizontal and vertical boundary as $$DCVal = \left(\sum_{x'=0}^{nS-1} p[x', -1] + \sum_{y'=mS-nS}^{mS-1} p[-1, y'] + nS\right) \gg (k + 1).$$

In some embodiments an apparatus comprises a processor and a memory including computer program code, the memory and the computer program code configured to, with the processor, cause the apparatus to:
receive an encoded block of pixels;
determine a set of potential reference samples for the block of pixels;
select a subset of the set of potential reference samples to be used as reference samples for the block of pixels;
determine reference samples for the encoded block of pixels;
use the determined reference samples to define a DC prediction value for the block of pixels;
receive a prediction error for a pixel of the encoded block of pixels; and
reconstruct the pixel value on the basis of the DC prediction value and the prediction error.

In some embodiments the memory and the computer program code are configured to, with the processor, cause the apparatus to select the reference samples among pixels of encoded neighboring blocks of the block of pixels.

In some embodiments the set of potential reference samples for the block of pixels comprises the pixels of the decoded neighboring block which are adjacent to the block of pixels.

In some embodiments the set of potential reference samples for the block of pixels comprises a part of the pixels of the decoded neighboring block which are adjacent to the block of pixels.

In some embodiments the selected reference samples contain half of the pixels of the decoded neighboring block which are adjacent to the block of pixels.

In some embodiments every other pixel of the decoded neighboring block which are adjacent to the block of pixels are selected as reference samples.

In some embodiments the memory and the computer program code are configured to, with the processor, cause the apparatus to select the samples for a square block of size nS×nS pixels as follows:

$$predSamples[x, y] = \left(\sum_{x'=nH}^{nS-1} p[x', -1] + \sum_{y'=nH}^{nS-1} p[-1, y'] + nH\right) \gg k,$$

$$x, y = 0 \ldots nS - 1$$

where nH=nS/2, p represents the array of the reference pixels and k=log 2(nS).

In some embodiments the memory and the computer program code are configured to, with the processor, cause the apparatus to calculate the DC prediction as follows:

$$DCVal = \left(\sum_{x'=nH}^{nS-1} p[x', -1] + \sum_{y'=nH}^{nS-1} p[-1, y'] + nH\right) \gg k, x, y = 0 \ldots nS - 1$$

where nH=nS/2, p represents the array of the reference pixels and k=log 2(nS).

In some embodiments the predicted block differs from a square, wherein the memory and the computer program code are configured to, with the processor, cause the apparatus to select all samples on a boundary having smaller number of potential reference samples than another boundary, and to select the same number of samples on the other boundary.

In some embodiments the predicted block is of size nS×mS, nS<mS, wherein the memory and the computer program code are configured to, with the processor, cause the apparatus to generate the DC prediction value using nS samples on both horizontal and vertical boundary as $$DCVal = \left(\sum_{x'=0}^{nS-1} p[x', -1] + \sum_{y'=mS-nS}^{mS-1} p[-1, y'] + nS\right) \gg (k + 1).$$

In some embodiments a storage medium having stored thereon a computer program code a computer executable program code for use by an encoder, said program codes comprise instructions for use by an encoder, said program code comprises instructions for:
receiving a block of pixels;
determining a set of potential reference samples for the block of pixels;
selecting a subset of the set of potential reference samples to be used as reference samples for the block of pixels;
using the selected reference samples to determine a DC prediction value for the block of pixels.

In some embodiments the computer program code is configured to, with the processor, cause the apparatus to determine a prediction error for a pixel in the block of pixels on the basis of the DC prediction value and the value of the pixel in the block of pixels.

In some embodiments the computer program code is configured to, with the processor, cause the apparatus to select the reference samples among pixels of encoded neighboring blocks of the block of pixels.

In some embodiments the set of potential reference samples for the block of pixels comprises the pixels of the encoded neighboring block which are adjacent to the block of pixels.

In some embodiments the set of potential reference samples for the block of pixels comprises a part of the pixels of the encoded neighboring block which are adjacent to the block of pixels.

In some embodiments the selected reference samples contain half of the pixels of the encoded neighboring block which are adjacent to the block of pixels.

In some embodiments every other pixel of the encoded neighboring block which are adjacent to the block of pixels are selected as reference samples.

In some embodiments the computer program code is configured to, with the processor, cause the apparatus to select the samples for a square block of size nS×nS pixels as follows:

$$predSamples[x, y] = \left(\sum_{x'=nH}^{nS-1} p[x', -1] + \sum_{y'=nH}^{nS-1} p[-1, y'] + nH\right) \gg k,$$
$$x, y = 0 \ldots nS - 1$$

where nH=nS/2, p represents the array of the reference pixels and k=log 2(nS).

In some embodiments the computer program code is configured to, with the processor, cause the apparatus to calculate the DC prediction as follows:

$$DCVal = \left(\sum_{x'=nH}^{nS-1} p[x', -1] + \sum_{y'=nH}^{nS-1} p[-1, y'] + nH\right) \gg k, x, y = 0 \ldots nS - 1$$

where nH=nS/2, p represents the array of the reference pixels and k=log 2(nS).

In some embodiments the predicted block differs from a square, wherein the computer program code is configured to, with the processor, cause the apparatus to select all samples on a boundary having smaller number of potential reference samples than another boundary, and to select the same number of samples on the other boundary.

In some embodiments the predicted block is of size nS×mS, nS<mS, wherein the computer program code is configured to, with the processor, cause the apparatus to generate the DC prediction value using nS samples on both horizontal and vertical boundary as $$DCVal = \left(\sum_{x'=0}^{nS-1} p[x', -1] + \sum_{y'=mS-nS}^{mS-1} p[-1, y'] + nS\right) \gg (k+1).$$

In some embodiments a storage medium having stored thereon a computer executable program code for use by a decoder, said program code comprises instructions for:

receiving an encoded block of pixels;
determining a set of potential reference samples for the block of pixels;
selecting a subset of the set of potential reference samples to be used as reference samples for the block of pixels;
determining reference samples for the encoded block of pixels;
using the determined reference samples to define a DC prediction value for the block of pixels;
receiving a prediction error for a pixel of the encoded block of pixels; and
reconstructing the pixel value on the basis of the DC prediction value and the prediction error.

In some embodiments the computer program code comprises instructions for selecting the reference samples among pixels of encoded neighboring blocks of the block of pixels.

In some embodiments the set of potential reference samples for the block of pixels comprises the pixels of the decoded neighboring block which are adjacent to the block of pixels.

In some embodiments the set of potential reference samples for the block of pixels comprises a part of the pixels of the decoded neighboring block which are adjacent to the block of pixels.

In some embodiments the selected reference samples contain half of the pixels of the decoded neighboring block which are adjacent to the block of pixels.

In some embodiments every other pixel of the decoded neighboring block which are adjacent to the block of pixels are selected as reference samples.

In some embodiments the computer program code is configured to, with the processor, cause the apparatus to select the samples for a square block of size nS×nS pixels as follows:

$$predSamples[x, y] = \left(\sum_{x'=nH}^{nS-1} p[x', -1] + \sum_{y'=nH}^{nS-1} p[-1, y'] + nH\right) \gg k,$$
$$x, y = 0 \ldots nS - 1$$

where nH=nS/2, p represents the array of the reference pixels and k=log 2(nS).

In some embodiments the computer program code is configured to, with the processor, cause the apparatus to calculate the DC prediction as follows:

$$DCVal = \left(\sum_{x'=nH}^{nS-1} p[x', -1] + \sum_{y'=nH}^{nS-1} p[-1, y'] + nH\right) \gg k, x, y = 0 \ldots nS - 1$$

where nH=nS/2, p represents the array of the reference pixels and k=log 2(nS).

In some embodiments the predicted block differs from a square, wherein the computer program code is configured to, with the processor, cause the apparatus to select all samples on a boundary having smaller number of potential reference samples than another boundary, and to select the same number of samples on the other boundary.

In some embodiments the predicted block is of size nS×mS, nS<mS, wherein the computer program code is configured to, with the processor, cause the apparatus to generate the DC prediction value using nS samples on both horizontal and vertical boundary as $$DCVal = \left( \sum_{x'=0}^{nS-1} p[x', -1] + \sum_{y'=mS-nS}^{mS-1} p[-1, y'] + nS \right) \gg (k+1).$$

In some embodiments an apparatus comprises:
means for receiving a block of pixels;
means for determining a set of potential reference samples for the block of pixels;
means for selecting a subset of the set of potential reference samples to be used as reference samples for the block of pixels;
means for using the selected reference samples to determine a DC prediction value for the block of pixels.

In some embodiments the apparatus further comprises means for determining a prediction error for a pixel in the block of pixels on the basis of the DC prediction value and the value of the pixel in the block of pixels.

In some embodiments an apparatus comprises:
means for receiving an encoded block of pixels;
means for determining a set of potential reference samples for the block of pixels;
means for selecting a subset of the set of potential reference samples to be used as reference samples for the block of pixels;
means for determining reference samples for the encoded block of pixels;
means for using the determined reference samples to define a DC prediction value for the block of pixels;
means for receiving a prediction error for a pixel of the encoded block of pixels; and
means for reconstructing the pixel value on the basis of the DC prediction value and the prediction error.

We claim:

1. A method comprising:
   receiving a block of pixels;
   determining a set of potential reference samples for the block of pixels, wherein the set of potential reference samples for the block of pixels comprises at least a part of the pixels of an encoded neighboring block which is adjacent to the block of pixels;
   selecting a subset of the set of potential reference samples to be used as reference samples for the block of pixels, wherein the selected subset of reference samples comprises sets of n consecutive reference samples with m reference samples between the sets wherein variables n and m are positive integers; and
   using the selected subset of reference samples to determine a DC prediction value for the block of pixels.

2. A method according to claim 1 further comprising determining a prediction error for a pixel in the block of pixels on the basis of the DC prediction value and the value of the pixel in the block of pixels.

3. A method according to claim 1, wherein the received block of pixels differs from a square, wherein the method comprises selecting all samples on a boundary having smaller number of potential reference samples than another boundary, and selecting the same number of samples on the other boundary.

4. A method comprising:
   receiving an encoded block of pixels;
   determining a set of potential reference samples for the block of pixels;
   selecting a subset of the set of potential reference samples to be used as reference samples for the block of pixels wherein the set of potential reference samples for the block of pixels comprises at least a part of the pixels of an encoded neighboring block which is adjacent to the block of pixels;
   determining reference samples for the encoded block of pixels, wherein the selected subset of reference samples comprises sets of n consecutive reference samples with m reference samples between the sets wherein variables n and m are positive integers;
   using the determined reference samples to define a DC prediction value for the block of pixels;
   receiving a prediction error for a pixel of the encoded block of pixels; and
   reconstructing the pixel value on the basis of the DC prediction value and the prediction error.

5. A method according to claim 4, wherein the received block of pixels differs from a square, wherein the method comprises selecting all samples on a boundary having smaller number of potential reference samples than another boundary, and selecting the same number of samples on the other boundary.

6. An apparatus comprising a processor and a memory including computer program code, the memory and the computer program code configured to, with the processor, cause the apparatus to:
   receive a block of pixels;
   determine a set of potential reference samples for the block of pixels, wherein the set of potential reference samples for the block of pixels comprises at least a part of the pixels of an encoded neighboring block which is adjacent to the block of pixels; and
   select a subset of the set of potential reference samples to be used as reference samples for the block of pixels, wherein the selected subset of reference samples comprises sets of n consecutive reference samples with m reference samples between the sets wherein variables n and m are positive integers;
   use the selected subset of reference samples to determine a DC prediction value for the block of pixels.

7. An apparatus according to claim 6, the memory and the computer program code further configured to, with the processor, cause the apparatus to determine a prediction error for a pixel in the block of pixels on the basis of the DC prediction value and the value of the pixel in the block of pixels.

8. An apparatus comprising a processor and a memory including computer program code, the memory and the computer program code configured to, with the processor, cause the apparatus to:
   receive an encoded block of pixels;
   determine a set of potential reference samples for the block of pixels, wherein the set of potential reference samples for the block of pixels comprises at least a part of the pixels of an encoded neighboring block which is adjacent to the block of pixels;
   select a subset of the set of potential reference samples to be used as reference samples for the block of pixels, wherein the selected subset of reference samples comprises sets of n consecutive reference samples with m reference samples between the sets wherein variables n and m are positive integers;
   determine reference samples for the encoded block of pixels;
   use the determined reference samples to define a DC prediction value for the block of pixels;
   receive a prediction error for a pixel of the encoded block of pixels; and
   reconstruct the pixel value on the basis of the DC prediction value and the prediction error.

9. A non-transitory storage medium having stored thereon a computer program code, said program codes comprising instructions for use by an encoder, said program code comprising instructions for:
- receiving a block of pixels;
- determining a set of potential reference samples for the block of pixels, wherein the set of potential reference samples for the block of pixels comprises at least a part of the pixels of an encoded neighboring block which is adjacent to the block of pixels;
- selecting a subset of the set of potential reference samples to be used as reference samples for the block of pixels, wherein the selected subset of reference samples comprises sets of n consecutive reference samples with m reference samples between the sets wherein variables n and m are positive integers; and
- using the selected subset of reference samples to determine a DC prediction value for the block of pixels.

10. A storage medium according to claim 9, the computer program code further configured to, with the processor, cause the apparatus to determine a prediction error for a pixel in the block of pixels on the basis of the DC prediction value and the value of the pixel in the block of pixels.

11. A non-transitory storage medium having stored thereon a computer executable program code for use by a decoder, said program code comprises instructions for:
- receiving an encoded block of pixels;
- determining a set of potential reference samples for the block of pixels, wherein the set of potential reference samples for the block of pixels comprises at least a part of the pixels of an encoded neighboring block which is adjacent to the block of pixels;
- selecting a subset of the set of potential reference samples to be used as reference samples for the block of pixels, wherein the selected subset of reference samples comprises sets of n consecutive reference samples with m reference samples between the sets wherein variables n and m are positive integers;
- determining reference samples for the encoded block of pixels;
- using the determined reference samples to define a DC prediction value for the block of pixels;
- receiving a prediction error for a pixel of the encoded block of pixels; and
- reconstructing the pixel value on the basis of the DC prediction value and the prediction error.

12. An apparatus comprising:
- means for receiving a block of pixels;
- means for determining a set of potential reference samples for the block of pixels, wherein the set of potential reference samples for the block of pixels comprises at least a part of the pixels of an encoded neighboring block which is adjacent to the block of pixels;
- means for selecting a subset of the set of potential reference samples to be used as reference samples for the block of pixels, wherein the selected subset of reference samples comprises sets of n consecutive reference samples with m reference samples between the sets wherein variables n and m are positive integers; and
- means for using the selected subset of reference samples to determine a DC prediction value for the block of pixels.

13. The apparatus of claim 12 further comprising:
- means for determining a prediction error for a pixel in the block of pixels on the basis of the DC prediction value and the value of the pixel in the block of pixels.

14. An apparatus comprising:
- means for receiving an encoded block of pixels;
- means for determining a set of potential reference samples for the block of pixels, wherein the set of potential reference samples for the block of pixels comprises at least a part of the pixels of an encoded neighboring block which is adjacent to the block of pixels;
- means for selecting a subset of the set of potential reference samples to be used as reference samples for the block of pixels, wherein the selected subset of reference samples comprises sets of n consecutive reference samples with m reference samples between the sets wherein variables n and m are positive integers;
- means for determining reference samples for the encoded block of pixels;
- means for using the determined reference samples to define a DC prediction value for the block of pixels;
- means for receiving a prediction error for a pixel of the encoded block of pixels; and
- means for reconstructing the pixel value on the basis of the DC prediction value and the prediction error.

* * * * *